INVENTOR.
HERBERT ROGALL
ROBERT FENNELL
BY
Constantine A. Michalos
ATTORNEY

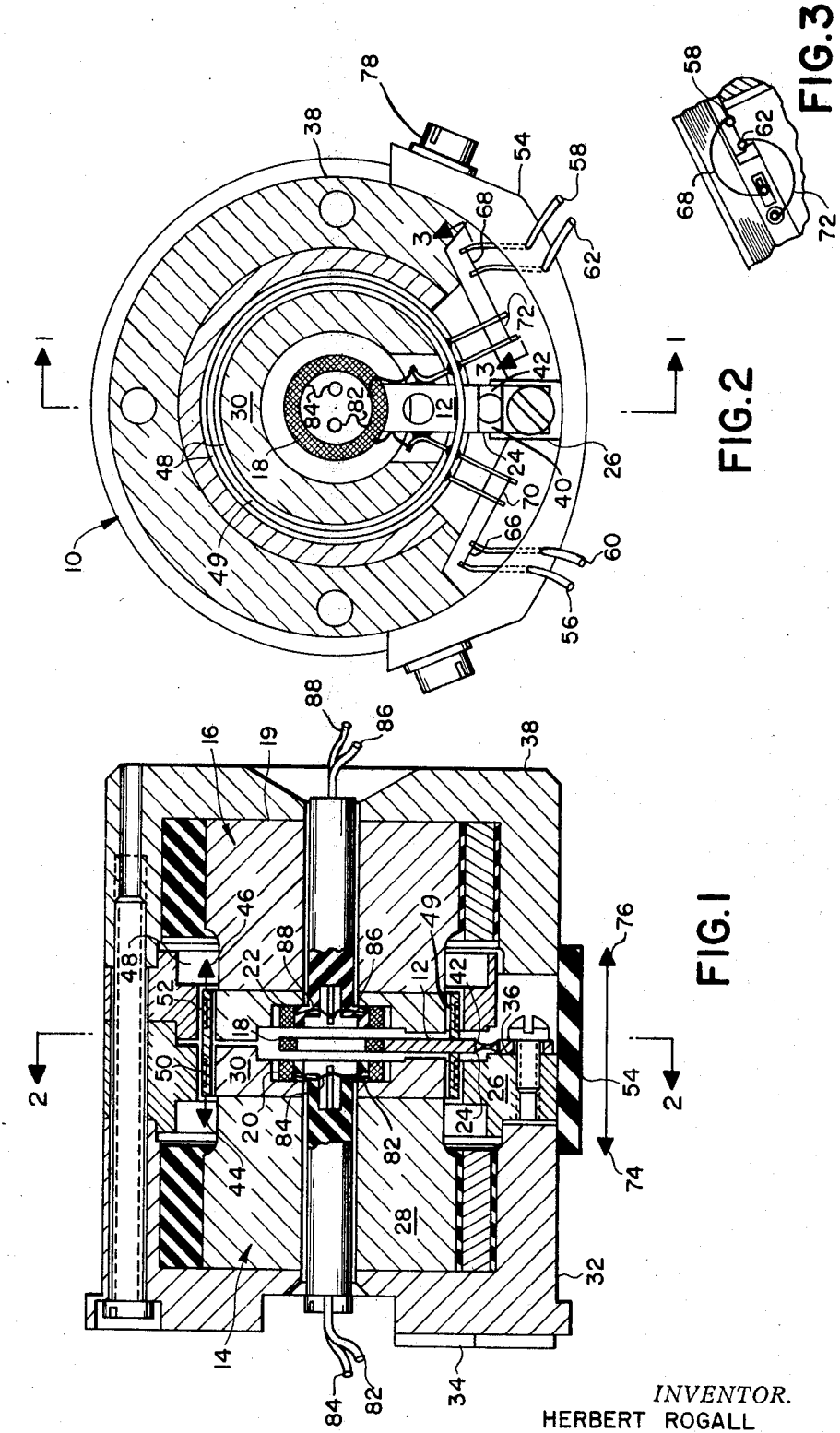

INVENTOR.
HERBERT ROGALL
ROBERT FENNELL

BY

Constantine A. Michalos
ATTORNEY

United States Patent Office 3,513,711
Patented May 26, 1970

---

3,513,711
SUBMINIATURE SINGLE AXIS ACCELEROMETER
Herbert Rogall, Maplewood, and Robert Fennell, Little
Falls, N.J., assignors to Singer-General Precision, Inc.,
a corporation of Delaware
Filed Oct. 3, 1966, Ser. No. 583,864
Int. Cl. G01p 15/08
U.S. Cl. 73—517                                4 Claims

ABSTRACT OF THE DISCLOSURE

Two cup-shaped magnetic assemblies are fastened together to provide an enclosure or casing for the accelerometer, as well as a magnetic return path for the magnetic assemblies. Each magnetic assembly includes a central pole piece for supporting the primary pickoff coils and for forming air gaps within which a forcer coil may be located. A pendulum or proof mass is supported within the space between the two pole pieces by a flexure hinge or joint which permits movement thereof along the sensitive axis. Mounted on the pendulum is the secondary pickoff coil and the forcer coil each of which is electrically coupled to a harness type terminal board exterior to the casing via a plurality of flexleads. Since the terminal board is movably adjustable along the direction of the spin axis it may be used to provide a "vernier-like" adjustment to effect the null or zero reference condition of the pendulum. Finally, the forcer coil is supported on an aluminum bobbin fixed to the pendulum. The eddy currents induced in the bobbin set up interacting magnetic fields which tend to oppose and therefore damp the motion of the pendulum.

---

This invention relates to an accelerometer, and more particularly, to a pendulous, force-balanced subminiature single axis accelerometer of a configuration which results in a smaller size, fewer parts, and greater inherent stability than previously available in this type of an instrument.

Heretofore, an accelerometer generally comprised of a case having two enclosures, one of the enclosures incorporating the instrument mounting, or reference surfaces to which was affixed a pendulous mass or sensing element, by means of a flexure suspenion. The mounting arrangement was very complex, necessitating a plurality of elements. Attached to the pendulous mass were the moving elements of a displacement transducer and an electromagnetic forcer which was incorporated in the other enclosure. The fixed elements of the transducer and forcer were mounted on the case. The heretofore accelerometers utilized a magnet assembly comprised of a permanent magnet, a pole piece, and a return path which was mounted on each side of the case to provide a field of permanent magnetic flux in which the electromagnetic force coil operated. Very thin metallic flexleads provided flexible, low-restraint electrical connections to the transducer and forcer coils on the moving pendulum. Any residual torques on the pendulum were biased out by a bias adjuster which worked by the attraction or repulsion of two small permanent magnets; one located on the bias adjuster, and one on the pendulum.

In the operation of the heretofore accelerometers, the acceleration applied to the case resulted in rotation relative to the case of the pendulum about the flexure. The displacement transducer provided an electrical signal which was proportional to this rotation. The transducer signal was then amplified by external circuitry and fed back to the forcer coil as a direct current. This current gave rise to a force or torque on the pendulum which restored it very close to the transducer null position. The current required to restore the pendulum to null was a measure of the acceleration applied to the case.

Therefore, the accelerometer case formed the basis of the instrument which contained the mounting or reference surfaces, and in general, defined the juxtaposition of the accelerometer elements. A flexure was attached to the case, a pendulous mass to the flexure, and a displacement transducer and forcer attached to the pendulous mass. The fixed or reference elements of the transducers were attached to the complex magnet assembly which provided the operating flux for the forcer and which in turn was also mounted to the case. The multiplicity of joints and fastenings resulted in mechanical instabilities. It complicated the assembly procedures and it made necessary close tolerance control. In addition, the large number of parts required, made the accelerometer to be of a relatively larger size than it should have been.

Therefore, an object of this invention is to provide a compact, highly-sensitive accelerometer having fewer parts and fewer and less complex assembly steps than heretofore provided.

Another object of this invention is to provide an accelerometer having a relatively easier means of fabrication by providing tolerance requirements on parts which are not as critical as heretofore required.

A further object of this invention is to provide a novel accelerometer of a reduced size and weight having increased reliability and increased mechanical stability with a resultant increase in performance stability with time, temperature, vibration and shock.

Further objects and advantages of the present invention will be specifically pointed out or will otherwise become apparent when referring, for a better understanding of the invention, to the following description taken in conjunction with the accompanying drawings, wherein:

FIG. 1 is a side longitudinal sectional view through an accelerometer embodying the present invention, the section being taken along line 1—1 of FIG. 2;

FIG. 2 is a front sectional view through the accelerometer, the section being taken along line 2—2 of FIG. 1;

FIG. 3 is a fragmentary section showing the flexleads taken as indicatetd by line 3—3 in FIG. 2;

Figure 4:
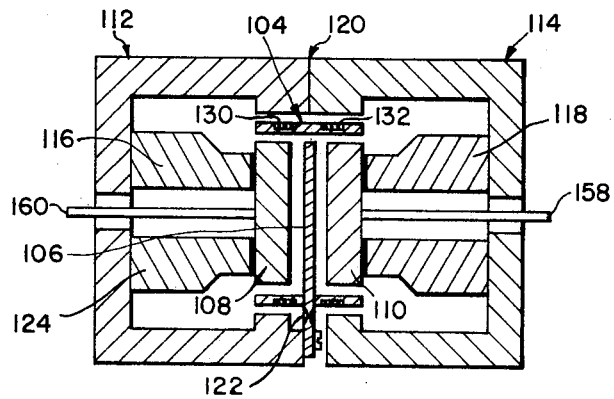
FIG. 4 is a longitudinal sectional view of an accelerometer in accordance with another embodiment of this invention.

Referring now to the drawing, and particularly to FIGS. 1, 2, 3, and 6, an accelerometer 10 basically includes a foreshortened pendulum 12 interposed between two magnet assemblies 14 and 16, wherein the pendulum 12 supports a secondary or pickoff coil 18 and the magnet assemblies 14 and 16 support primary or stationary coils 20 and 22 respectively. The secondary coil 18 is attached, through a flexure section 24, to a base 26 of the magnet assembly 14 and the primary coils 20 and 22 are attached directly to the magnet assemblies 14 and 16, respectively. Each magnet assembly 14 and 16 is comprised of a magnet 28, a pole piece 30, and a return path 32. External mounting surfaces 34, as well as an internal pendulum mounting surface 36 of the base 26 are incorporated in the return path 32 of the magnet assembly 14.

It should be noted at this time that the two magnet assemblies 14 and 16 are joined together to completely enclose the elements of the accelerometer and thus perform a double function of an enclosure 38 for the system and return paths 32 for the magnet assemblies 14 and 16. By this configuration, the size and weight of the accelerometer 10 is substantially reduced.

As shown in FIGS. 1 and 2, the pendulum 12 is necked-down and cut through locally at the flexure section 24 to from a pair of flexures 40 and 42 thereby providing maximum lateral stiffness while eliminating the need for independent flexures, intermediate elements to support the flexures, all joints usually associated with the parts in supporting the pendulum.

It should be noted that flexures 40 and 42 are constructed of one piece thereby reducing the need for aligning the two flexures. Inherently, the two flexures 40 and 42 are therefore better aligned and also attain better uniformity of thickness and spacing.

The pair of flexures 40 and 42 permit the pendulum 12 to move in an arc about a pivot axis passing commonly through each flexure and perpendicular to the plane of the paper as viewed in FIG. 1.

Pendulum 12 carries with it a secondary coil 18 and a cylindrical form or bobbin 49 as shown in FIGS. 1 and 2. The secondary coil 18 comprises the moving element of a displacement transducer and is utilized as a pickoff coil for developing a signal proportional to the displacement of the pendulum in response to accelerations applied to the enclosure along a sensitive axis passing centrally through coil 18 and perpendicular to the plane of the paper as view in FIG. 2.

Bobbin 49 which also follows the motion of the pendulum and thus moves in an arc as shown by arrows 44 and 46 in FIG. 1 within a flux saturated annular air gap 48 when the enclosure is under the influence of an acceleration, has a pair of torquers or restoring coils 50 and 52 continuously wound around the outside peripheral surface thereof as shown. When coils 50 and 52 are energized with a suitable current the magnitude field developed thereby will interact with the magnetic field across gap 48 and restore the pendulum to its null or neutral position in a well-known manner. Ordinarily, however, means are necessary to damp the motion of the bobbin and therefore of the pendulum as it is restored to null. In prior art accelerometers, the interior of the enclosure is usually filled with a fluid and the motion of the pendulum is viscously damped. In the present invention, viscous damping and the use of a fluid filled enclosure are done away with completely by utilizing eddy current damping of the bobbin 49. That is, bobbin 49 is fabricated from a suitable conductive material having a high strength to weight ratio such as aluminum for example. Motion of the bobbin through the air gap 48 induces eddy currents therein which, in turn, develop their own magnetic field. The interaction between the eddy current induced fields and the permanent field in gap 48 thus serves to damp the dynamic response of the bobbin and prevent oscillation about its null position.

In the embodiment shown in FIGS. 1, 2, 3, and 6 electrical connections to the pendulum 12 are made through an adjustable terminal board 54 by four insulated conductors 56, 58, 60 and 62, which go through the terminal board 54 to four flexleads 66, 68, 70 and 72. Restraints on pendulum 12, due to these flexleads 66, 68, 70 and 72 can be altered by moving the terminal board 54 in directions as shown by arrows 74 and 76. In this manner restraints on the pendulum can be biased out. That is, to adjust the initial or null angular position of the pendulum 12, the accelerometer 10, shown in FIGS. 1 to 3, is provided with the laterally movable terminal head 54. As best shown in FIG. 2, the terminal head 54 is supported on the enclosure 38 by means of bolts 78. The bolts 78 go through slotted holes (not shown) in the terminal head to permit the lateral movement, and are threaded onto the enclosure 38 for stationary support thereon. As best shown in FIG. 3, the terminal head 54 also includes means for supporting the four flexleads 66, 68, 70, and 72. The flexleads 66, 68, 70, and 72 in turn are connected to the pendulum 12, as shown in FIG. 2. Therefore, any movement of the flexleads 66, 68, 70, and 72 will effect the movement of the pendulum 12. Therefore, any restraints on the pendulum can be biased out by the flexleads which can be adjusted by movement of the terminal head 54 as shown by the arrows 74 and 76.

Figure 6:
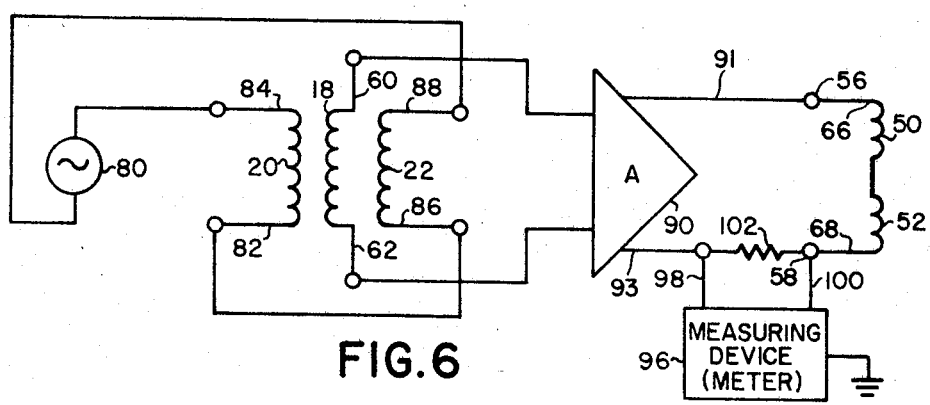
FIG. 6 is a schematic of the electric circuit arrangement of FIGS. 1 to 3.

The electrical circuit of the accelerometer 10 of FIGS. 1 to 3 is shown in FIG. 6. The circuit of FIG. 6 includes an alternating current source 80 which connects the primary coils 20 and 22 in series by line conductors 82, 84 and 86, 88, respectively. In addition the circuit of FIG. 6 includes an amplifier 90 which connects the secondary coil 18 through conductors 60 and 62 to the torquer coils 50 and 52 by line conductors 91 and 93. The torquer coils 50 and 52 are connected in series by flexleads 66, 68, and terminals 56, 58, respectively. Further the electrical circuit of FIG. 6 includes a measuring device such as a meter 96 interposed between the amplifier 90 and torquer coils 50 and 52 which is connected by line conductors 98 and 100 across a resistor 102.

Figure 7:
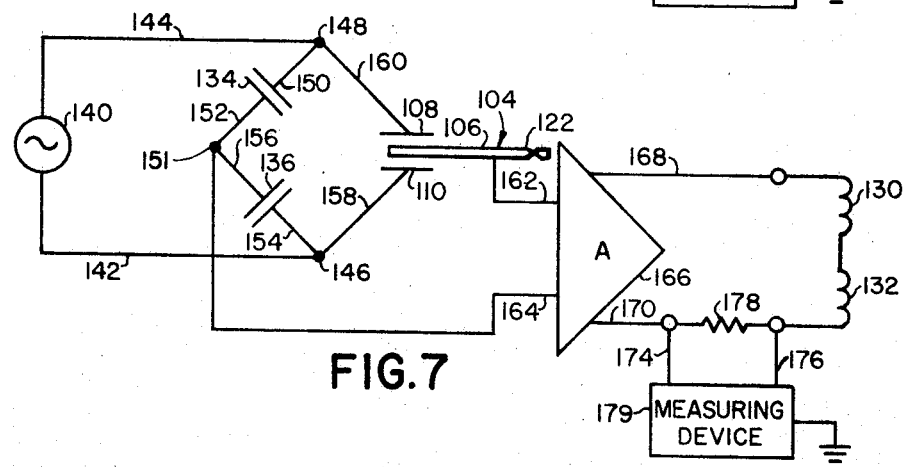
FIG. 7 is a schematic of the electric circuit arrangement of FIG. 4.

Referring now to the second embodiment of the invention and particularly to FIGS. 4 and 7, the accelerometer 104 basically includes a foreshortened pendulum 106 interposed between a pair of pole pieces or discs 108 and 110 and within enclosures 112 and 114 of two magnet assemblies 116 and 118. As shown in FIG. 4, the monolithic pendulum 106 is also the moving plate of a differential capacitance transducer, the fixed elements of which are the pole pieces or discs 108 and 110 of two magnet assemblies 116 and 118, respectively. The enclosures 112 and 114 are attached together at 120 and the pendulum 106 is attached through a flexure section 122 to the base of one magnet assembly 116. Each magnet assembly 116 and 118 comprises a magnet 124, a pole piece such as pole piece 108 and a return path such as return path 112. As shown in FIGS. 1 and 3, external mounting surfaces, as well as internal pendulum mounting surfaces, of the base are incorporated in one return path such as the return path 112 of the magnet assembly 116.

As in the other embodiments of this invention, the two elements of the accelerometer. The enclosures 112 and 114 which are joined together to completely enclose the elements of the accelerometer. The enclosures 112 and 114 thus perform a double function of an enclosure for the system and a return path for the magnet assemblies 116 and 118. As noted before, by this configuration the size and weight of the accelerometer is substantially reduced.

The electric circuitry shown in FIG. 7 of the second embodiment of this invention includes the pendulum 106 interposed between the pole pieces or plates 108 and 110. The plate 108 is attached to a source of alternating current 140 through line conductors 144 and 160 at junction 148. The plate 110 is attached to the other terminal of the alternating current source 140 through conductors 142 and 148 at junction 146. Junction 148 is attached to an external capacitor 134 by line conductor 150 and junction 146 is attached to another external capacitor 136 by line conductor 154. The other sides of the capacitors 134 and 136 are attached to a junction 151 by line conductors 152 and 156, respectively, thereby forming an electrical bridge wherein the capacitance ratio between the moving plate or pendulum 106 and each of the fixed plates 108 and 110 are equal to the ratio of capacitance of the fixed capacitors 134 and 136 in a null position of the pendulum 106. That is, the bridge is in equal balance and no output signal is produced. When the pendulum 106 moves one way or the other, the balance is altered proportional to the position of the pendulum 106 and the stationary plates 108 and 110 and a signal is produced. This signal is directed through line conductors 162 and 164 to an amplifier 166. As in the circuitry of FIG. 6, the amplifier 166 is attached to torquer coils 130 and 132 through line conductors 168 and 170. The torquer coils 130 and 132 are attached by means of a continuous winding technique. Further the electrical circuit of FIG. 7 also includes a measuring device 179 interposed between the amplifier 166 and torquer coils 130 and 132 which in turn is connected by line conductors 174 and 176 across a resistor 178.

Figure 5:
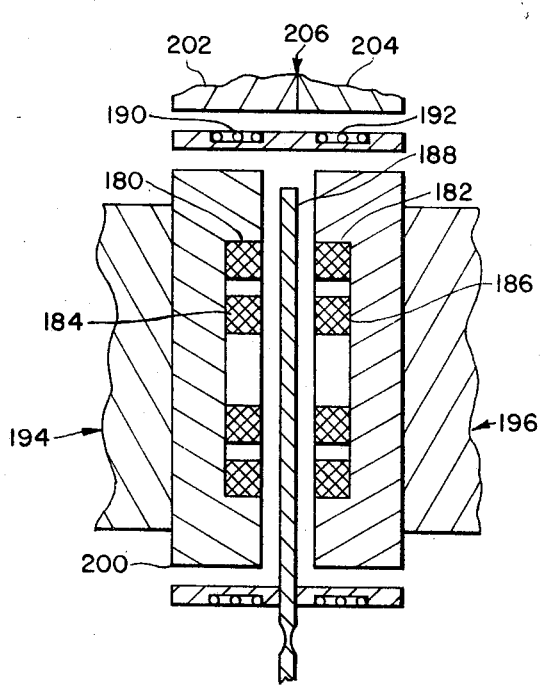
FIG. 5 is a longitudinal sectional view of a fragmentary portion of an accelerometer in accordance with still another embodiment of this invention.
Figure 8:
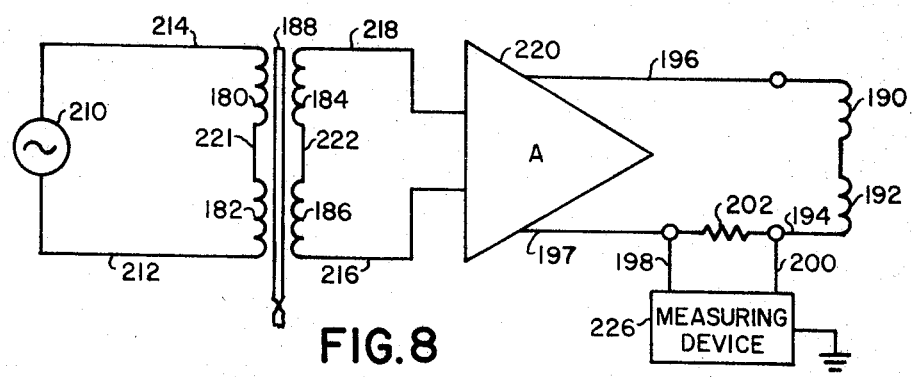
FIG. 8 is a schematic of the electric circuit arrangement of FIG. 5.

A third embodiment of this invention is shown in FIGS. 5 and 8. The accelerometer of FIG. 5 includes a foreshortened pendulum 188 which is the moving element of an eddy current transducer with primary coils 180 and 182 and secondary coils 184 and 186 attached to magnet assemblies 194 and 196. As in the other embodiments, the magnet assemblies 194 and 196 include pole pieces such as pole piece 200 and the pendulum 188 includes cylinder supporting torquer coils 190 and 192. The accelerometer of FIG. 5 also includes enclosures 202 and 204 connected at 206 to produce a compact fully enclosed housing as in the embodiments of FIGS. 1 and 4.

The electrical circuit of the accelerometer of FIG. 5 is shown in FIG. 8. This circuit includes an alternating current source 210 which connects the primary coils 180 and 182 in series by line conductors 212, 214, and 221. The secondary coils 184 and 186 are connected at one terminal by line conductor 222 and by their other terminals through line conductors 216 and 218 to an amplifier 220. The amplifier 220 is connected to the torquer coils 190 and 192 in series in the same manner as for FIGS. 6 and 7 by line conductors 196 and 197. The electrical circuit of FIG. 8 also includes a measuring device 226 which is interposed between the amplifier 220 and the torquer coils 190 and 192 which in turn is connected by line conductors 198 and 200 across a resistor 202.

Basically the accelerometer has been reduced to its essential elements. One part, the magnet return path, performs a function of the case, pendulum support, external mounting and internal mounting references surfaces, and magnet flux return path. Together with the magnet and pole pieces it provides the operating field for the restoring force. A second part, a pendulum, serves as a flexure, sensing element and moving element of the displacement transducer. The pendulum also supports a restoring force coil. Finally the function of bias adjustment and electrical connection through the terminal board and flexleads provides for vernier adjustment of the pendulum.

A further feature of this invention is that there is no liquid within the enclosure needed for damping of the pendulum. In place of the liquid there is provided an aluminum alloy used for producing an increased eddy current effect. The increased eddy current permits damping of the system as did the liquid in the other accelerometers.

In summary, therefore, in the heretofore accelerometers the primary coils were attached to the magnet assemblies, the magnet assemblies were attached to the flexure joint which in turn was attached to the complex support structure which was used to support the secondary coil.

In the present invention the primary coils are attached directly to the magnet assemblies, the magnet assemblies are attached directly to the flexure joint which in turn is attached directly to the secondary coil.

This novel approach resulted in fewer parts, fewer and less complex assembly steps and easing of tolerance requirements since the number of parts required was reduced. Since the number of parts were reduced the size and weight in turn was reduced and therefore increased reliability with increased mechanical stability, and increased performance stability with time, temperature, vibration and shock, were obtained.

While the present invention has been described in preferred embodiments, it will be obvious to those skilled in the art that various modifications can be made therein within the scope of the invention, and it is intended that the appended claims cover all such modifications.

What is claimed is:

1. A single axis accelerometer comprising, a pair of cup-shaped members coaxial with said axis and having their open ends facing one another to form an enclosure, each of said members supporting a magnetic pole piece at one end thereof wherein the free ends of said pole pieces extend toward each other along said axis but terminate substantially intermediately of said enclosure to form an axial space therebetween, said pole pieces thereby also forming a corresponding pair of flux-saturated annular air gaps within said enclosure such that said enclosure members comprise flux return paths respectively for each of said magnetic pole pieces, a pair of stationary pickoff elements respectively supported on the axial free-end faces of said pole pieces and a pendulous proof-mass supported for movement within said axial space in response to accelerations applied to said enclosure along said axis, said pendulous proof-mass having a pick-off element for movement between said stationary pickoff elements and a restoring coil for movement within said flux-saturated air gaps, electronic circuit means operably receiving and deciphering the movement of said proof-mass into a signal proportional to said applied acceleration, and flexleads connecting said proof-mass with said electronic circuit means, said electronic circuit means including a terminal board mounted externally to said enclosure and being directly coupled to said flexleads, said terminal board being adjustably movable relative to said proof-mass for applying a vernier-like torque adjustment to said proof-mass and thereby regulating said proof-mass to its null position upon zero acceleration.

2. The accelerometer as claimed in claim 1, wherein said stationary pickoff elements are the fixed elements of a differential capacitance transducer, and the pickoff element carried by said pendulous proof-mass is the moving element of said transducer, said transducer being coupled to an electronic circuit for generating a signal proportional to the displacement of said pendulous proof-mass, said circuit including means for feeding said signal back through said restoring coil to reposition said pendulous proof-mass at a null reference position in the presence of said applied accelerations.

3. The accelerometer as claimed in claim 1, wherein said moving pickoff element carried by said pendulous proof-mass comprises the moving vane of an eddy current transducer, and said stationary pickoff elements mounted on said pole pieces each comprise a pair of concentrically related coils mounted separately on each pole piece respectively, the differential currents induced between said separate pairs of coils respectively being dependent upon the location of said vane relative to said pole pieces and therefore upon the acceleration applied to said enclosure.

4. A single axis accelerometer comprising, a pair of cup-shaped members coaxial with said axis and having their open ends facing one another to form an enclosure, each of said members supporting a magnetic pole piece at one end thereof wherein the free ends of said pole pieces extend toward each other along said axis but terminate substantially intermediately of said enclosure to form an axial space therebetween, and a pendulous proof-mass supported for movement within said axial space in response to accelerations applied to said enclosure along said axis, wherein the improvement comprises means for supporting said pendulous proof-mass for movement within said axial space, said last mentioned means including a flexure joint integrally attached at one end thereof to the lower portion of said proof-mass and at the other end thereof to one of said enclosure members, said flexure joint having a necked-down section formed into a plate with the central portion thereof being cut through to form a hole thereby providing a pair of integral transversely-spaced flexure hinges having common pivot axes and disposed substantially at right angles to said first mentioned axis.

References Cited

UNITED STATES PATENTS 3,413,854  12/1968  Graf ---------------- 73—382

JAMES J. GILL, Primary Examiner

H. GOLDSTEIN, Assistant Examiner